(12) United States Patent
Schäfer et al.

(10) Patent No.: US 6,981,478 B2
(45) Date of Patent: Jan. 3, 2006

(54) ELECTRICALLY DRIVEN CAMSHAFT ADJUSTER

(75) Inventors: Jens Schäfer, Herzogenaurach (DE); Martin Steigerwald, Erlangen (DE); Jon Heywood, Pettstadt (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/104,135

(22) Filed: Apr. 12, 2005

(65) Prior Publication Data

US 2005/0199201 A1   Sep. 15, 2005

Related U.S. Application Data

(63) Continuation of application No. PCT/EP03/11286, filed on Oct. 11, 2003.

(30) Foreign Application Priority Data

Oct. 17, 2002  (DE) ................ 102 48 355

(51) Int. Cl.
 *F01L 1/34*  (2006.01)
(52) U.S. Cl. ............... 123/90.17; 123/90.15; 123/90.31
(58) Field of Classification Search ............ 123/90.17, 123/90.15, 90.31, 90.11
See application file for complete search history.

(56) References Cited

U.S. PATENT DOCUMENTS 3,978,829 A * 9/1976 Takahashi et al. ........ 123/90.15

FOREIGN PATENT DOCUMENTS

| DE | 37 23 099 | 1/1989 |
|----|-----------|--------|
| DE | 41 10 195 | 10/1992 |
| DE | 41 33 408 | 4/1993 |
| DE | 195 47 101 | 6/1997 |
| DE | 197 02 670 | 3/1998 |
| DE | 198 07 315 | 8/1999 |
| DE | 101 29 766 | 1/2002 |
| DE | 100 54 798 | 5/2002 |
| EP | 0 143 368 | 6/1986 |
| EP | 0 396 280 | 11/1990 |
| EP | 1 136 657 | 3/2001 |

* cited by examiner

*Primary Examiner*—Thomas Denion
*Assistant Examiner*—Zelalem Eshete
(74) *Attorney, Agent, or Firm*—Volpe and Koenig, P.C.

(57) ABSTRACT

A device for electrically adjusting the relative rotation of two shafts, particularly a camshaft (15) in relation to a crankshaft of an internal combustion engine is provided. The adjusting device includes an adjusting gear system which is embodied as a triple-shaft gear mechanism and is provided with a crankshaft-fixed input part, a camshaft-fixed output part, and an adjusting shaft (13) that is connected in a torsion-proof manner to an electric adjusting motor shaft (32) of an electric adjusting motor (3). The adjusting motor (3) is configured as a brushless DC motor having a housing-fixed stator (35) and a permanent magnet rotor (34). A high degree of adjustment accuracy and adjustment speed are provided with minimal space requirements and low power consumption. This is achieved through the use of a double eccentric gear mechanism (2) and a double planetary gear mechanism, which are provided with a speed reduction of up to about 1:250 and low friction, as an adjusting gear system while using a highly inductive permanent magnet rotor for the adjusting motor (3).

26 Claims, 14 Drawing Sheets

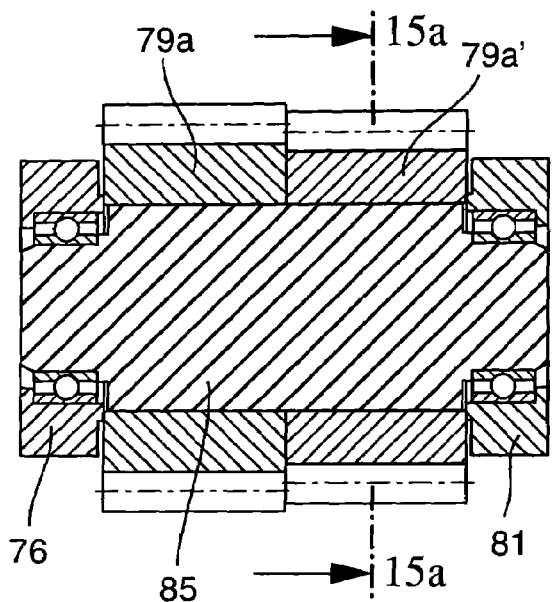
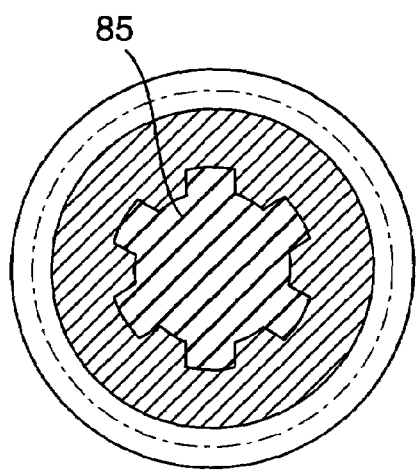
Fig. 15　　　　Fig. 15a
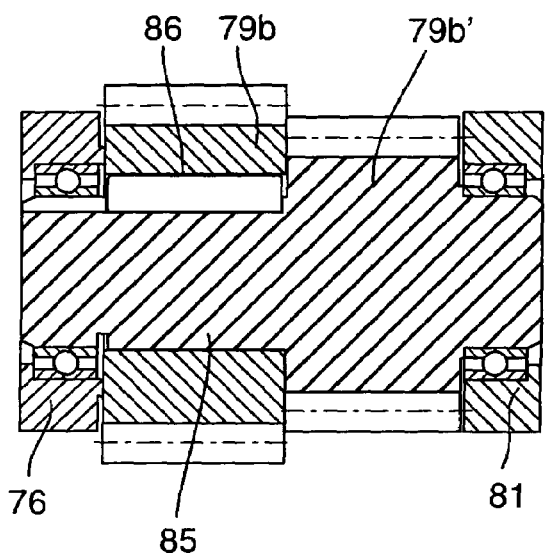
Fig. 16

ELECTRICALLY DRIVEN CAMSHAFT ADJUSTER

CROSS-REFERENCE TO RELATED APPLICATIONS

This application is a continuation of PCT/EP2003/011286, filed Oct. 11, 2003, which is incorporated herein by reference as if fully set forth.

FIELD OF THE INVENTION

The invention relates to a camshaft adjuster for electrically adjusting the position of the angle of rotation of the camshaft in relation to the crankshaft of an internal-combustion engine, and in particular to an adjusting gear mechanism, which is formed as a triple-shaft gear mechanism and which has a crankshaft-fixed driving part, a camshaft-fixed driven part, and an adjusting shaft connected in a torsion-proof manner to an adjusting motor shaft of an electric adjusting motor, wherein the adjusting motor is formed as a brushless DC motor with a housing-fixed stator and a permanent magnet rotor.

BACKGROUND

For hydraulic camshaft adjusting systems, in which the adjustment is realized through the motor oil pressure, the function of the camshaft adjuster is greatly dependent on the temperature of the motor oil. At low temperatures and thus viscous oil, no regulation or adjustment is possible, because the oil can flow not at all or only very slowly through the oil lines to the adjuster or away from the adjuster. A high oil pressure is achieved but no or only minimal volume flow. At high temperatures, the opposite occurs. The oil is very thin, which causes a large amount of leakage. Therefore, high pressure is not established and only slow adjustment can be realized or the set position can be maintained only poorly. In addition, the oil pressure and thus the function of the camshaft adjuster depends on the engine speed of the internal-combustion engine. In contrast, electric camshaft adjusters function independent of oil pressure. Therefore, the previously discussed problems do not occur, so that the operating range and the operating reliability of the adjuster are increased.

In DE 41 10 195 A1, an adjusting device for electrical adjustment of the relative position of the angle of rotation of two shafts, especially a camshaft in relation to a crankshaft of an internal-combustion engine, with an adjusting gear mechanism formed as a triple-shaft gear mechanism is disclosed, which comprises a crankshaft-fixed driving part, a camshaft-fixed driven part, and an adjusting shaft connected in a torsion-proof manner to an adjusting-motor shaft of an electric adjusting motor, wherein the adjusting motor is formed as a brushless DC motor with a housing-fixed stator and a permanent magnet rotor. The adjusting gear mechanism is formed as a planetary gear mechanism, whose self-locking is mentioned multiple times and is emphasized as an advantage.

However, such self-locking produces disadvantages in terms of the adjusting speed and the necessary adjusting energy. In addition, the unbalanced eccentric drive leads to non-quiet running when the adjusting motor is working.

SUMMARY

Therefore, the invention is based on the objective of providing an adjusting device for electric adjustment of the position of the angle of rotation of a camshaft in relation to a crankshaft of an internal-combustion engine, which features high adjustment accuracy and adjustment speed with low space and energy requirements.

According to the invention, the problem is solved by providing the adjusting gear mechanism preferably formed as a double eccentric gear mechanism or the adjusting gear mechanism is preferably formed as a double planetary gear mechanism. Both adjusting gear mechanisms are distinguished by high speed reduction of preferably $\leq 250$ and low friction. The high speed reduction enables precise angle setting and permits the use of small, fast-running adjusting motors. These save structural space and costs. The low friction has a positive effect on the power consumption and the stator heating in adjusting operation. In addition to the double eccentric and double planetary gear mechanisms, among other types, other high speed-reducing adjusting gear mechanisms, for example, single eccentric and single planetary gear mechanisms, shaft gear mechanisms, such as, for example, the harmonic-drive gear mechanism, twin-spin gear mechanisms, as well as wobble and reduction-servo gear mechanisms, can also be considered.

The adjusting motor can be configured with or without brushes. The brushless version offers the advantage of lower friction and the lack of wear, which more than compensates for the additional expense for electronic commutation.

The housing-fixed stator enables a simple, reliable, and wear-free power supply to the stator windings. The highly inductive permanent magnet rotor containing rare-earth metals has a high torque and self-holding moment, which brings and fixes the camshaft quickly into the set position in connection with the high speed reduction of the adjusting gear mechanism and despite its low friction and lack of self-locking. The motor can also be formed as a disk armature.

In addition to the typical aligned arrangement of the adjusting motor and adjusting gear mechanism, there is also the possibility of a radial allocation of the same with, for example, a connection through a bevel gear pair or a worm gear pair. In addition, it is conceivable to arrange the adjusting motor parallel to the adjusting gear mechanism if there is a lack of axial installation space. A connection between the two can be realized through a toothed-belt or chain drive or by means of toothed wheels or a cardan shaft. In this way, a large degree of flexibility is given in terms of shape and volume of the adjusting device.

A contribution to minimizing the friction of the adjusting gear mechanism and adjusting motors is realized by forming their bearings preferably as roller bearings. However, sliding bearings can also be used, if cost and installation-space reasons are dominant. This applies, for example, for the bearing of the driving wheel.

In one advantageous configuration of the invention, central tension screws or a circular spline connection is provided, which has cylindrical screw heads or a cylindrical circular spline bore hub, which are used as a bearing surface for roller bearings, for torsion-proof connection of the camshaft and adjusting gear mechanism. Therefore, separate space for the bearing is eliminated, which saves structural length. The circular spline connection also offers the advantage that no additional components, such as feather keys or screws, are required. Therefore, installation space is also saved, which can be used for other purposes.

The advantage of reduced installation space also offers a direct screw connection. In this connection, the adjusting gear mechanism is screwed directly onto the camshaft. For this purpose, on the drive-side end of the camshaft, a camshaft journal with external threading is required and on a camshaft-fixed component of the adjusting gear mechanism, internal threading is required. In this way, the adjusting gear mechanism can be screwed directly onto the camshaft and tightened by means of a tool like for the circular spline connection. Both in the circular spline connection and also in the direct screw connection, an exact position-ing of the adjusting gear mechanism is not possible and also not necessary in the controlled case.

An advantageous improvement of the invention can be seen in that for torsion-proof connection of the adjusting shafts and the adjusting-motor shafts, a one-piece configuration of the two shafts is provided in the shape of a single hollow shaft (integrated adjusting motor) and between both shafts, a rotational backlash-free, disengaging coupling is provided for connecting the separate shafts (separate adjusting motor). The solution with integrated adjusting motor is simpler in production, because it can get by with only two instead of three bearings for both shafts. In addition, the otherwise necessary coupling can be eliminated. However, the integrated adjusting motor cannot be completed in advance. It must be completed with the help of an assembly tool on the adjusting gear mechanism itself.

In contrast, in the solution with separate adjusting motor, at least two, but preferably three, bearings are needed for the two separate shafts. In addition, a rotational backlash-free, disengaging coupling between both shafts is required, which, however, permits advance completion of the adjusting motor and simple assembly of the same on the adjusting gear mechanism.

The assembly of the integrated adjusting motor and the centering of its stator on its permanent magnet rotor is simplified such that an assembly tool is provided, whose preferably three equal vanes arranged at equal spacing can be inserted through three corresponding assembly slots in the outer adjusting motor housing into the air gap between the permanent magnet rotor and the stator with slight radial play and the assembly slots can be closed by a fitting closing cover.

As rotational backlash-free, disengaging couplings, preferably two-edge couplings, feather key couplings, or splined shaft couplings are considered. Profiled shaft couplings, such as polygonal, toothed, and four-edge or six-edge shaft couplings are also conceivable.

The assembly of the adjusting motor is realized through simple insertion of the coupling part located on the free end of the adjusting motor shaft into the complementary coupling part of the adjusting shaft. Because both coupling parts fit together with practically no backlash and are self-centering, absolutely no additional measures are required for the assembly and disassembly. The axial movement of the shaft connections permits unimpaired heat expansion of the camshaft, adjusting shaft, and adjusting motor shaft.

For the bearing of the hollow shaft, it is advantageous that this has an outer grooved ball bearing in front of the permanent magnet rotor and the other hollow shaft has another internal rotor bearing on another cylindrical screw head of an elongated, central tension screw in the region of the permanent magnet rotor.

If the hollow shafts have at least one outlet bore hole and an adjusting motor-side closing stopper, then the oil can be removed and thus the rotary mass moment of inertia of the hollow shafts can be minimized. At the same time, supply of oil from the hollow shafts into the interior of the adjusting motor is prevented.

Corresponding to its different function, it is advantageous that the adjusting gear mechanisms have oil-lubricated roller bearings and the adjusting motors have oil-lubricated and grease-lubricated roller bearings. The roller bearings of the adjusting motor must partially also take over sealing functions for its interior.

A simple and effective lubrication of the adjusting gear mechanism and the oil-lubricated bearing of the adjusting motors is achieved, such that the lubricating oil is fed from the oil supply of the end bearing of the camshaft near the gear mechanism through lubricating-oil bore holes into the region of the adjusting gear mechanism near the axle and from there through centrifugal force to the bearings and into the peripheral region, as well as farther into the space of the cylinder head, where it is used for centrifugal oiling or as spray oil for lubricating the oil-lubricated roller bearing of the adjusting motors.

It is advantageous that the grease-lubricated roller bearing of the adjusting motors have one seal on both bearing sides and the oil-lubricated roller bearings of the adjuster motors have one seal on the adjusting motor side. In grease-lubricated roller bearings, the two-sided seals are used for protection against loss of lubricant. In oil-lubricated roller bearings, the seal on the adjusting motor side permits the entrance of the lubricating oil to the bearing and simultaneously prevents the loss of oil in the adjusting motor interior.

In an alternative solution of lubricating the roller bearings of the adjusting motors, their roller bearings are formed without seals, but a screen or filter for protection against metal particles is arranged at least on the adjusting gear mechanism side and in this case, the stator, together with a PC board or Hall sensor, has an injection-molded part or a cover film made from heat-resistant and oil-resistant plastic. In this way, destruction due to motor oil of the insulating lacquer of the stator winding of the adjusting motors and their PC boards or Hall sensors is prevented. In this case, motor oil is permitted in the interior of the adjusting motor, at the same time the screen or filter prevents the penetration of iron residue in the motor oil, which would become fixed to the permanent magnet rotor. An advantage of this type of seal in comparison with radial shaft seals is their lack of frictional resistant and their small structural length.

The structural length of the adjusting motor is also reduced, in that the grease-lubricated roller bearings of an adjusting motor are arranged on a preferably solid adjusting motor shaft directly next to the permanent magnet rotor and at least partially within the winding heads of the stator. The solid adjusting motor shaft has a relatively small diameter, which offers sufficient space for housing the roller bearings within the winding heads.

The centrifugal disk mounted on the gear mechanism-side outer side of the grease-lubricated roller bearing acts like a labyrinth seal as an additional seal against motor oil. Therefore, in connection with the two-side sealed, grease-lubricated roller bearings, a lubricating oil-free interior of the adjusting motor is achieved, whereby special lubricating-oil protection of the stator becomes unnecessary.

Because the length of the permanent magnet rotor is increased relative to the stator by its maximum difference in length due to expansion, the active length of the stator remains constant even at different component temperatures.

The same effect is achieved with a correspondingly lengthened stator, but with the acceptance of increased structural length.

The housing-fixed stator can also be cooled advantageously by air or coolant. Therefore, its load can be increased and thus its structural volume can be decreased without reducing its service life.

It has been shown to be advantageous that the adjusting shaft of the double eccentric gear mechanism is formed as a double eccentric shaft with equal eccentrics, which are offset by 180° and which drive equal spur pinions that mesh with equal internal gearing of a crankshaft-fixed ring gear, whose drive moment can be transferred by means of driving pins to a camshaft-fixed closing wall. The equal eccentrics offset by 180° have the effect, together with the equal spur pinions, of total mass balancing and therefore vibration-free running of the double eccentric gear mechanism in the adjusting operation. The crankshaft-fixed ring gear can also have a divided configuration, wherein the tooth backlash can be overcome by mutual tensioning of the two parts.

It is also advantageous that the driving pins are pressed into axis parallel pin bore holes of the closing wall and engage with a positive fit in axis parallel spur pinion bore holes of the spur pinions.

For the assembly of the double eccentric gear mechanism, it is advantageous that the diameter of the spur pinion bore holes corresponds at least to the diameter of the driving pins increased by twice the eccentricity of the eccentrics and that the spur pinion bore holes and the pin bore holes have equal pitch diameters and equal spacing.

One advantageous improvement of the invention is provided in that the adjusting shaft of the double planetary gear mechanism is formed as a sun wheel, which is supported on a central tension screw in a sun wheel bearing and which is connected in a torsion-proof manner to a not-shown adjusting motor by means of a splined shaft coupling. In addition, the sun wheel meshes with first planetary gears, which are each connected in a torsion-proof manner to coaxial second planetary gears of smaller or larger diameter according to the design. The desired large speed reduction of this adjusting gear mechanism follows from the slightly different number of teeth of the planetary gears and the ring gears.

Advantageous structural configurations of the double planetary gear mechanism are provided in that the first planetary gears mesh with internal gearing of a crankshaft-fixed ring gear and the second planetary gears mesh with internal gearing of smaller or larger diameter of a camshaft-fixed ring gear and that the planetary gears are formed in one piece and supported by means of planetary bearings on axis parallel connecting pins, which are connected to a planetary carrier that is supported by rollers by means of a planetary carrier bearing on another cylindrical screw head.

An alternative shaping of the planetary gears is characterized in that separately manufactured planetary gears are connected in a torsion-proof manner by a splined shaft and other separately manufactured planetary gears are connected in a torsion-proof manner by a feather-key connection and are supported by rollers directly in the planetary carrier and its closing plate.

Advantageously, the drive and driven shafts of the adjusting gear mechanism can be connected by a biased spring, preferably a spiral spring, which moves the camshaft into a starting or emergency-running position against the friction moment of the camshaft if the power or the adjusting motor fails. The spiral spring has a fail safe function, because if the internal-combustion engine dies, also in the case of loss of power, the camshaft moves into a position, from which restarting and thus at least emergency operation is possible. The spiral spring also overcomes the friction moment of the valve drive and possible seizing in the adjusting gear mechanism. Instead of the spiral spring, other springs can also be used.

BRIEF DESCRIPTION OF THE DRAWINGS

Additional features of the invention emerge from the following description and the drawings, in which several preferred embodiments of the invention are shown schematically.

In the drawings:

FIG. 15 is a longitudinal section through the planetary gears for the double planetary gear mechanism from FIG. 14, but formed separately and connected in a torsion-proof manner to an externally supported splined shaft;

FIG. 15a is a cross section through a planetary gear from FIG. 15;

FIG. 16 is a longitudinal section through separately formed planetary gears, of which one has a shaft butt end, on which the other is fixed with a feather key connection;

DETAILED DESCRIPTION OF THE PREFERRED EMBODIMENTS

Figure 1:
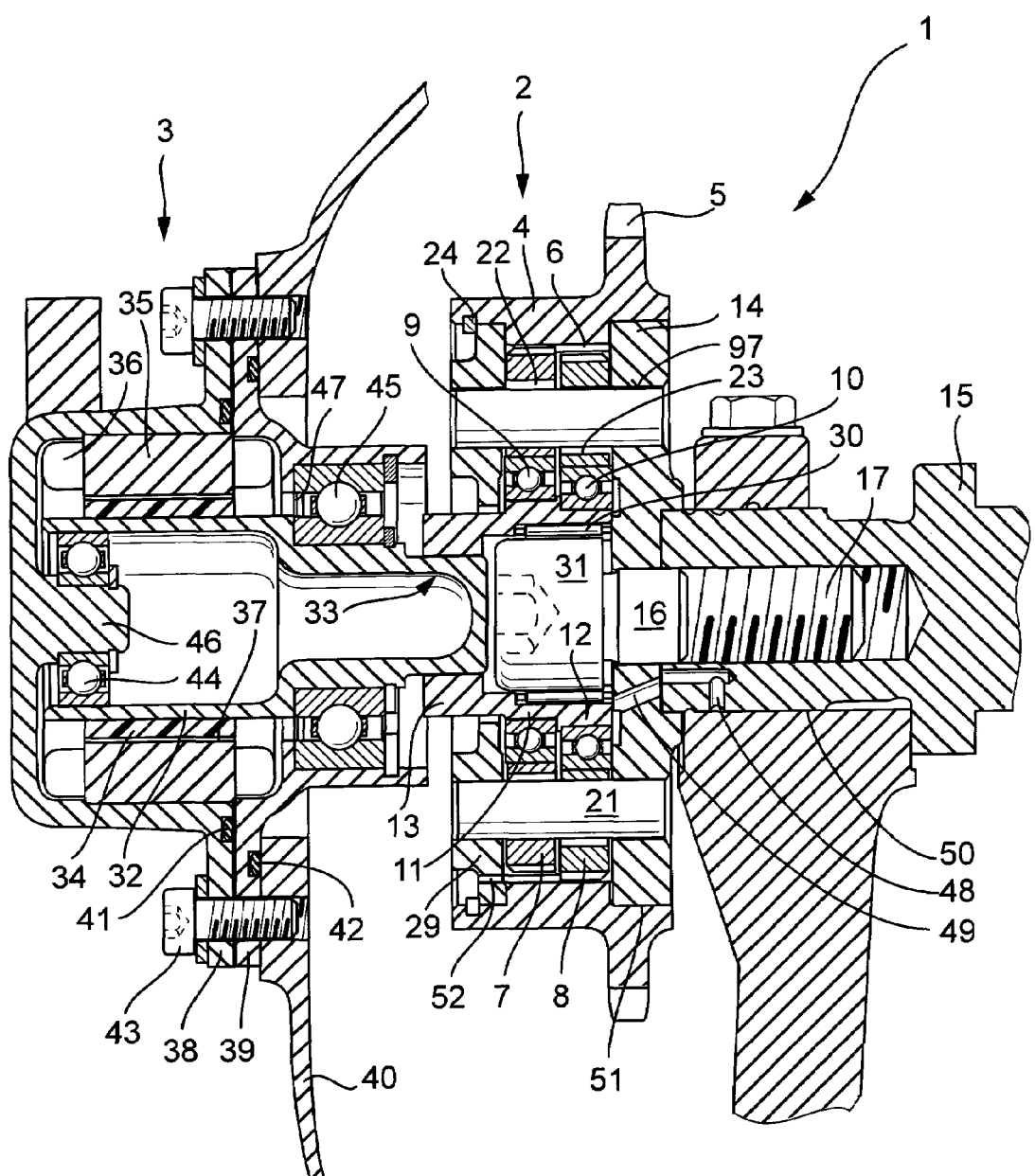
FIG. 1 is a longitudinal section through the adjusting device according to the invention with an eccentric gear mechanism and an adjusting motor, whose adjusting motor shaft is connected in a disengaging way by a two-edge shaft coupling to a double eccentric shaft of a double eccentric gear mechanism, which is supported on the cylindrical head of a central tension screw by means of a needle bushing.

FIG. 1 shows an embodiment of an adjusting device 1 formed according to the invention comprising a high speed-reducing adjusting gear mechanism (speed reduction up to 1:250), which is formed as a double eccentric gear mechanism 2, and an adjusting motor 3, which is a brushless DC motor. The double eccentric gear mechanism 2 and the adjusting motor 3 are separate units.

The adjusting gear mechanism is formed as a triple shaft gear mechanism comprising a drive shaft, a driven shaft, and an adjusting shaft. The drive shaft is formed as a ring gear 4, on whose periphery a chain wheel 5 is arranged. On its inner periphery, there is internal gearing 6. The chain wheel 5 is connected in a torsion-proof manner by means of a chain to the crankshaft, both of which are not shown. The internal gearing 6 meshes with two spur pinions 7, 8, which are driven by means of spur pinion bearings 9, 10 by 180° offset eccentrics 11, 12 of an adjusting shaft, which is formed as double eccentric shaft 13. The ring gear 4 is supported on a chain wheel bearing 51 formed as a sliding bearing of a closing wall 14, wherein the closing wall 14 is centered on a camshaft 15 or on a guide 16 of a central tension screw 17. The guide 16 is centered in the camshaft 15.

With the central tension screw 17, the closing wall 14 is tensioned in a torsion-proof manner against the camshaft 15 and thus has the function of a driven shaft. Driving pins 21 are connected rigidly to the closing wall 14. They are used for transferring the torque of the spur pinions 7, 8 to the camshaft 15 by means of the closing wall 14. The driving pins 21 project through bore holes 22, 23 of the spur pinions 7, 8, wherein the diameter of the bore holes 22, 23 corresponds to that of the driving pins 21 plus twice the eccentricity of the eccentrics 11, 12. The number of driving pins 21 depends on the magnitude of the torque to be transferred. In the present case, there are eight.

At the free end of the driving pins 21, there is a closing cover 29, which forms the seal of the adjusting gear mechanism and which has the effect of fixing the adjusting shaft 13 in the axial direction and also guiding the lubricating oil within the adjusting gear mechanism. The closing cover 29 is fixed in the axial direction by a retaining ring 24 on its periphery or by retaining rings 25 on the free end of each driving pin 21 (see FIG. 4).

The adjusting shaft formed as hollow double eccentric shaft 13 is supported in the region of the eccentrics 11, 12 by means of a double eccentric shaft bearing 30, which is formed as a needle bushing, on a cylindrical screw head 31 of the central tension screw 17. The double eccentric shaft bearing 30 can also be formed alternatively with two needle bushings lying one next to the other or with roller bearings. The double eccentric shaft 13 is connected to an adjusting motor shaft 32 of the adjusting motor 3 by means of a two-edge shaft coupling 33 (see also FIGS. 2 and 3) in a rotational backlash-free but movable in the longitudinal direction manner. A permanent magnet rotor 34 is mounted on the adjusting motor shaft 32. This is surrounded by a stator 35 and windings with winding heads 36 and separated from this stator by an air gap 37.

The adjusting motor 3 has a housing, which comprises an outer adjusting motor housing 38 and an inner adjusting motor housing 39. Both housings 38, 39 are connected to each other by a not-shown transport lock before installation of the adjusting motor 3. The housings 38, 39 are sealed from each other and from a cylinder head 40 by O-rings 41, 42. The seal between attachment screws 43 and the cylinder head 40 is realized by means of a sealing mass applied to the screw threading. It is also conceivable to provide pocket hole threaded bore holes in the cylinder head 40 instead of the through hole threaded bore holes, which would make sealing of the attachment screws 43 unnecessary. In order to be able to compensate for alignment errors between the axes of the adjusting motor 3 and the camshaft 15 during assembly, the through holes for the attachment screws 43 have a greater diameter.

The adjusting motor shaft 32 is supported in two grooved ball bearings 44, 45. The grooved ball bearing 44 is located in the interior of the adjusting motor shaft 32 on a journal 46 of the outer adjusting motor housing 38. It is lubricated with grease and sealed on two sides. The grooved ball bearing 45 is arranged on the outer periphery of the adjusting motor shaft 32 and in the inner adjusting motor housing 39. It has a seal 47 on the adjusting motor side. Therefore, the interior of the adjusting motor remains oil-free, while the grooved ball bearing 45 is lubricated by centrifugal oiling. Because the hollow adjusting motor shaft 32 is closed on its coupling end, its interior also remains oil-free.

The double eccentric gear mechanism 2 is lubricated by motor oil. This is led through lubricating oil bore holes 48, 49 in the end bearing 50 of the camshaft 15 near the gear mechanism and in the closing wall 14 to the double eccentric shaft bearing 30. From there, it flows outwards due to the effect of centrifugal force towards the spur pinion bearings 9, 10, the driving pins 21, the spur pinions 7, 8, and the internal gearing 6 of the ring gear 4, until it flows out through the chain wheel bearing 51 and through outlet openings 52 in the closing cover 29 into the space of the cylinder head 40. There it is used for centrifugal oiling or as spray oil for lubricating the oil-lubricated roller bearings 45; 30a, 44', 45' of the adjusting motors 3, 3''', 3''''.

Figure 2:
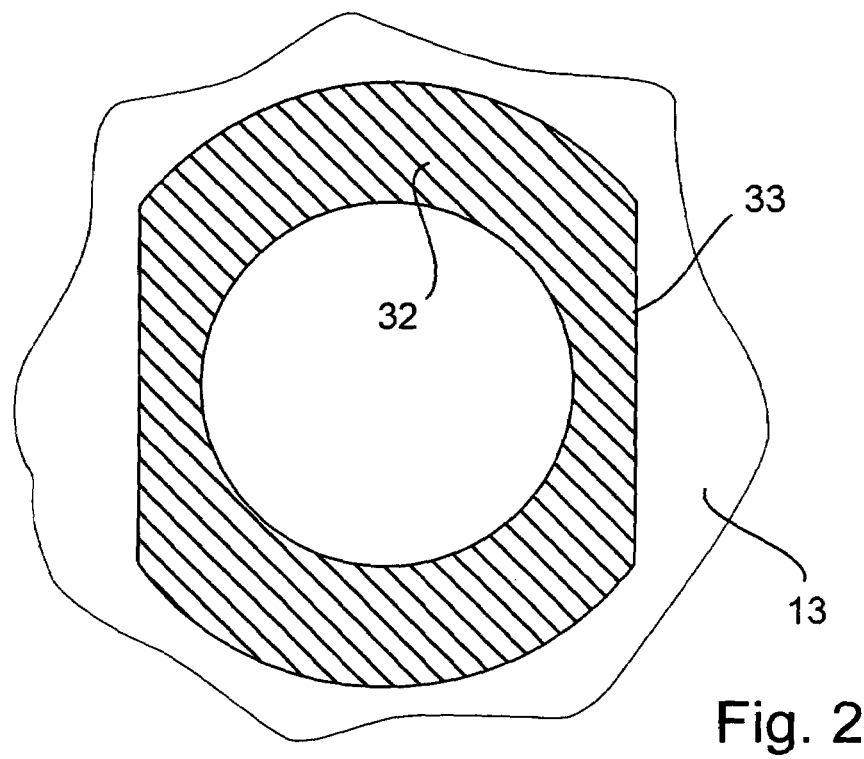
FIG. 2 is a cross section X—X through the enlarged two-edge shaft coupling from FIG. 3.
Figure 3:
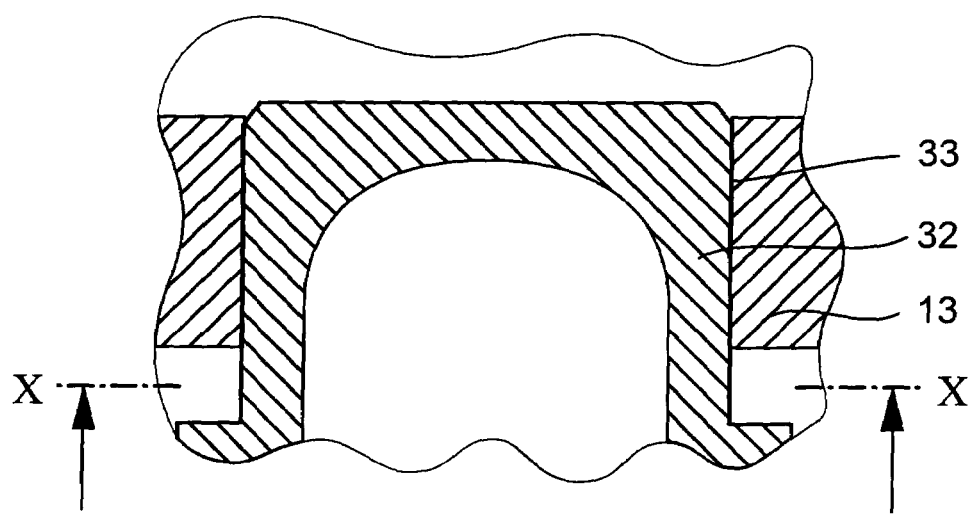
FIG. 3 is an enlarged longitudinal section through the two-edge shaft coupling from FIG. 2.

FIG. 2 shows a cross section X—X through an enlarged longitudinal section of the two-edge shaft coupling 33 of FIG. 1 shown in FIG. 3. It is used for transferring the torque of the adjusting motor shaft 32 to the double eccentric shaft 13. Due to the drive moments changing according to direction and magnitude, it is guaranteed that the two-edge shaft coupling 33 has practically no rotational backlash. In the axial direction, relative movement of the two-edge shaft coupling 33 is possible and necessary due to the expansion of the camshaft and adjusting shaft 15, 13 due to heat.

Figure 4:
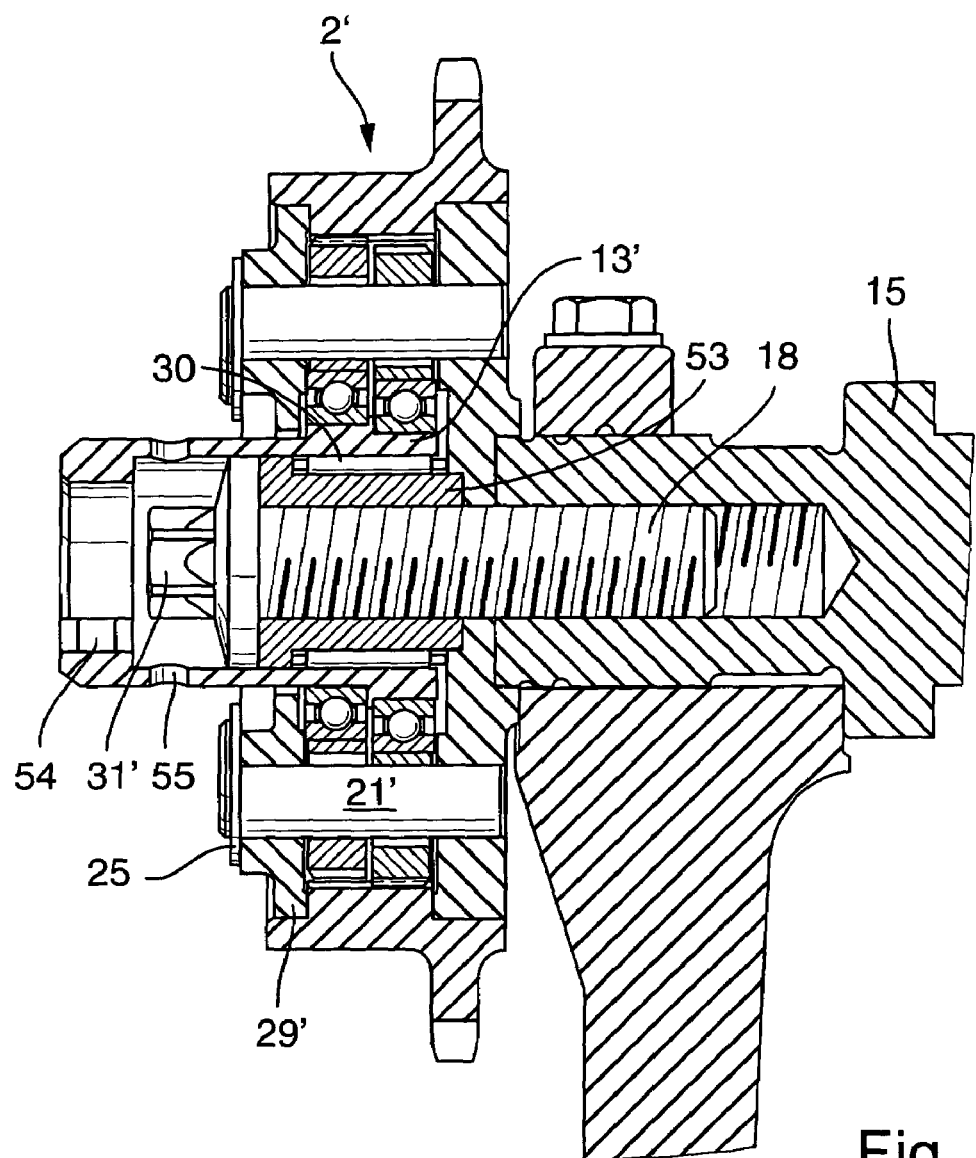
FIG. 4 is a view of the double eccentric gear mechanism from FIG. 1, but with a standard tension screw and a bearing bushing, as well as a feather key shaft coupling between double eccentric and adjusting motor shaft.

FIG. 4 shows a double eccentric gear mechanism 2', which differs from that of FIG. 1 by a central standard tension screw 18 with standard screw head 31' and an additional bearing bushing 53 for the double eccentric bearing 30, as well as by a feather key shaft coupling 54 between a double eccentric shaft 13' and the not-shown adjusting motor shaft. The advantage of this variant is that two easy-to-produce standard parts instead of the relatively complicated central tension screw 17 are used for tightening with the camshaft 15. A disadvantage is the greater necessary axial installation space.

In the double eccentric shaft 13', at the height of the standard screw head 31' there are radial bore holes 55. These bore holes prevent motor oil from collecting in the hollow double eccentric shaft 13' and leading to an increase of the mass moment of inertia of the same. A closing cover 29' is mounted axially in a different way than in FIG. 1 by retaining rings 25 on the free ends of the driving pins 21'.

Figure 5:
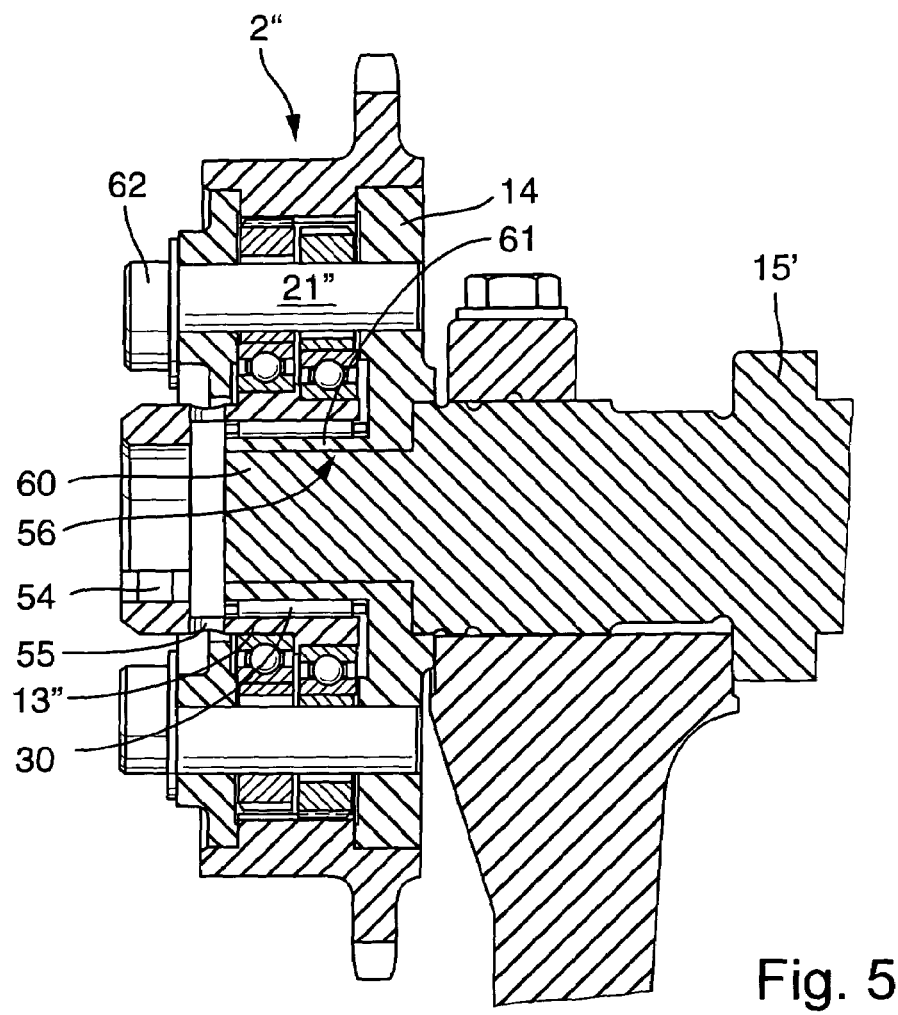
FIG. 5 is a view of the double eccentric gear mechanism from FIG. 1, but with a circular spline connection between the double eccentric gear mechanism and the camshaft.
Figure 6A:
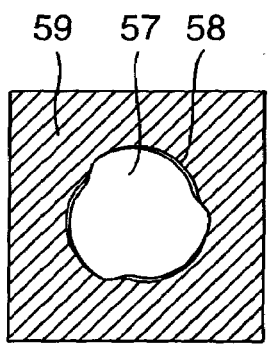
FIG. 6a is a cross section through a circular spline connection fitted one in the other with backlash.
Figure 6B:
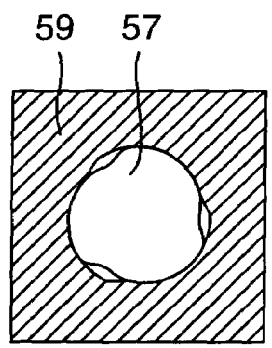
FIG. 6b is a view of the circular spline connection from FIG. 6a in slightly rotated, backlash-free state.
Figure 6C:
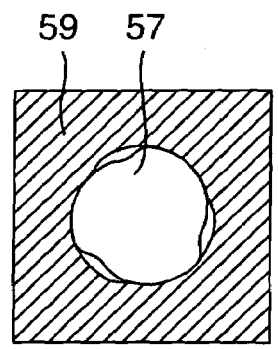
FIG. 6c is a view of the circular spline connection from FIG. 6b in positive and non-positive connection through further rotation.

FIG. 5 shows a double eccentric gear mechanism 2", which is connected to the camshaft 15' in a different way than in FIG. 1 by means of a circular spline connection 56. The principle of the circular spline connection 56 is explained with reference to FIGS. 6a, 6b, 6c. It concerns a positive and non-positive shaft-hub connection. This connection comprises a round inner part 57, whose periphery has at least two circular splines 58, and an outer part 59 with a bore hole, whose inner surface has the same number of complementary circular splines as the inner part 57. After the parts 57, 59 have been joined with play (see FIG. 6a), these are turned relative to each other so far until there is no play between them (see FIG. 6b). Through further turning, the circular spline surfaces are pressed against each other, so that a positive and non-positive connection is produced (see FIG. 6c). Here, the connection in the closing direction is a non-positive and positive fit. In the opening direction, it is only a non-positive connection. Therefore, backlash-free moment and force transfer in the rotational and axial direction is achieved, without additional components and their installation space being necessary. For this reason, the circular spline connection 56 is especially well suited for an electrical adjusting device with aligned axes of the adjusting gear mechanism and adjusting motor, because their axial installation space can be strongly reduced due to the lack of screw heads. In electrical camshaft adjusting devices with lateral adjusting motor, the circular spline connection provides smaller installation space advantages. Obviously, instead of the circular spline connection, polygonal or hyperbolic connections, for example, can also be used.

In FIG. 5, a camshaft end 60 carries the outer contours of the circular spline connection 56 and a circular spline bore hub 61 connected rigidly to the closing wall 14 carries the inner contours of the same. The circular spline bore hub 61 is also used as a bearing surface for the double eccentric shaft bearing 30. The double eccentric gear mechanism 2" is pushed onto the camshaft end 60 and turned by a certain angle. For this reason, on the free end of the driving pins 21", there are profiles 62, on which a tool for turning can be placed. Alternatively, for example, bore holes, in which a tool engages with journals or hook wrenches, which engage the chain wheel, are conceivable. A double eccentric shaft 13" with double eccentric shaft bearing 30, feather key shaft coupling 54, and radial bore holes 55 shows the gain in installation length relative to the double eccentric shaft 13' of FIG. 4.

In order to also bias the circular spline connection 56, the double eccentric gear mechanism 2" can be loaded by means of a press and turned in this state during assembly and before tightening in the axial direction. The circular spline connection 56 with three circular splines 58 offers the advantage of self-centering. However, two, four, and more circular splines 58 are also conceivable according to the application and the torque to be transferred. In order to increase the moment that can be transferred, the hub 61 can also be lengthened and/or increased in diameter.

Figure 7:
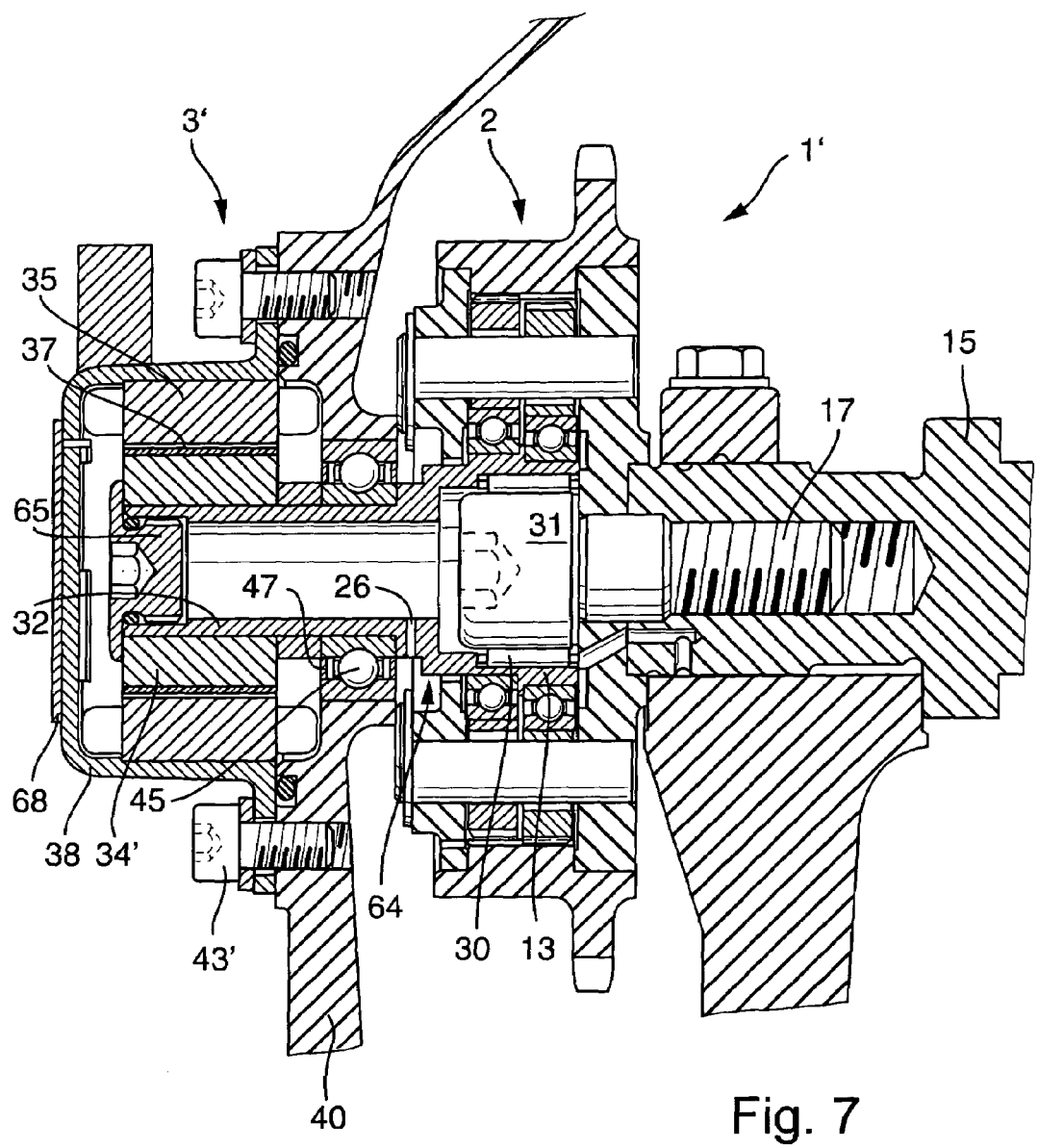
FIG. 7 is a longitudinal section through the adjusting device according to the invention from FIG. 1, but with double eccentric and adjusting motor shaft, which is formed as a hollow shaft in one piece and which has an outer grooved ball bearing in addition to the eccentric shaft bearing.

FIG. 7 shows a longitudinal section through an adjusting device 1'with the double eccentric gear mechanism 2 and an adjusting motor 3', which represents a variation of the adjusting device 1 from FIG. 1. It has a one-piece hollow shaft 64 formed from the double eccentric shaft 13 and the adjusting motor shaft 32'. Therefore, the otherwise necessary coupling between the shafts 13, 32' is eliminated.

The hollow shaft 64 is supported on its camshaft-side end by the double eccentric shaft bearing 30 on the cylindrical screw head 31 of the central tension screw 17. In addition, the hollow shaft 64 is supported in the cylinder head 40 by means of the grooved ball bearing 45 sealed on one side. Here, the seal 47 is also mounted on the adjusting motor side in order to guarantee the lubrication of the grooved ball bearing 45 by means of motor oil and to protect the adjusting motor 3' against the penetration of oil. The hollow shaft 64 is screwed onto the camshaft 15 together with a permanent magnet rotor 34', the grooved ball bearing 45, and the double eccentric gear mechanism 2. The hollow shaft 64 enables the central tension screw 17 to be reached with a screwdriver.

To prevent the motor oil from being led through the hollow shaft 64 into the adjusting motor 3', its end away from the camshaft is closed with a closing stopper 65. In FIG. 7, a threaded closing stopper 65 with an O-ring is selected. Alternatively, plastic stoppers can also be considered, which only have to be pressed in. The motor oil collecting in the hollow shaft 64 is discharged through an outlet opening 26.

Figure 8:
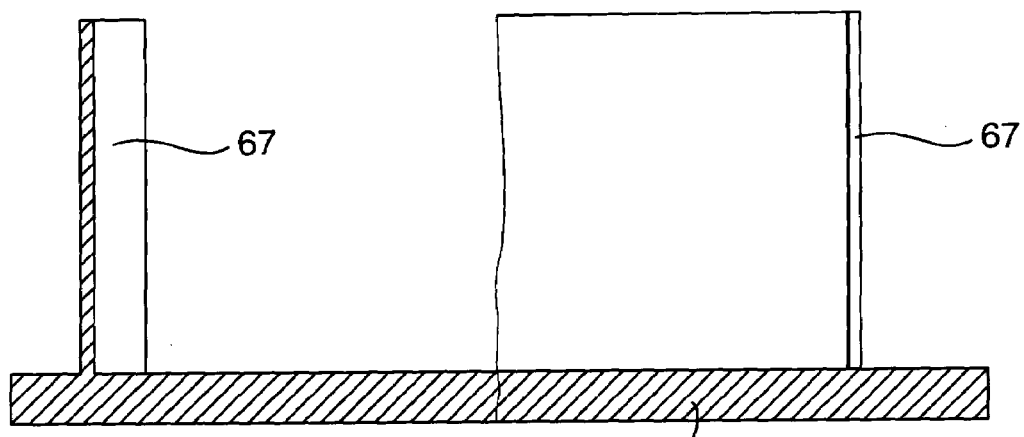
FIG. 8 is a cross section through an assembly tool for assembling the stator from FIG. 7.
Figure 9:
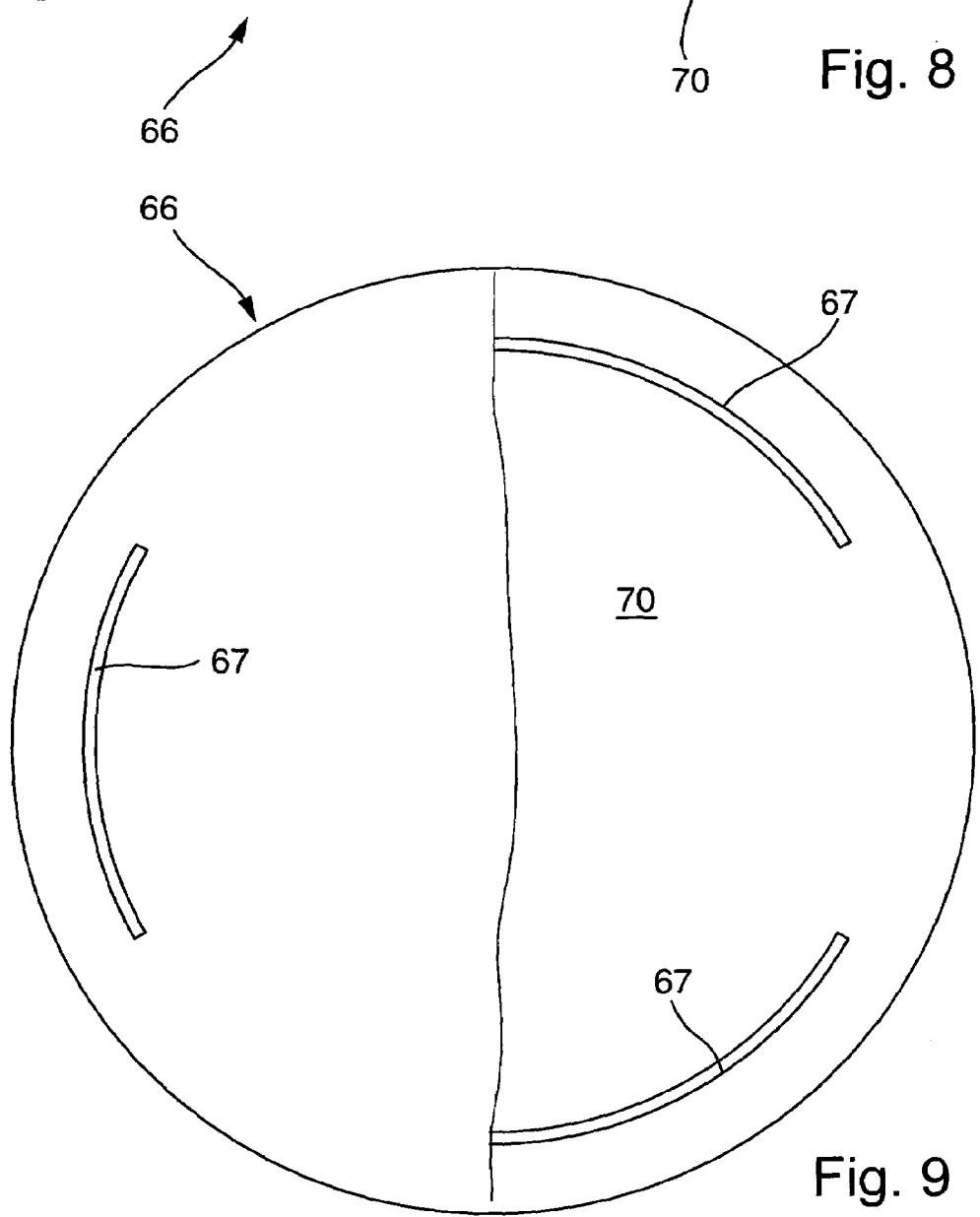
FIG. 9 is a plan view of the assembly tool from FIG. 8.

Because the adjusting motor 3' in the variant of FIG. 7 cannot be mounted as a unit, the outer adjusting motor housing 38 together with the stator 35 must be mounted separately. For this purpose, an assembly tool 66 from FIGS. 8 and 9 is helpful. This is used for centering the stator 35 on the permanent magnet rotor 34'. It consists of a base plate 70, on which three vanes 67 are arranged rigidly at the same spacing on the diameter of the air gap 37 (see FIG. 7), as well as with its thickness.

Figure 10:
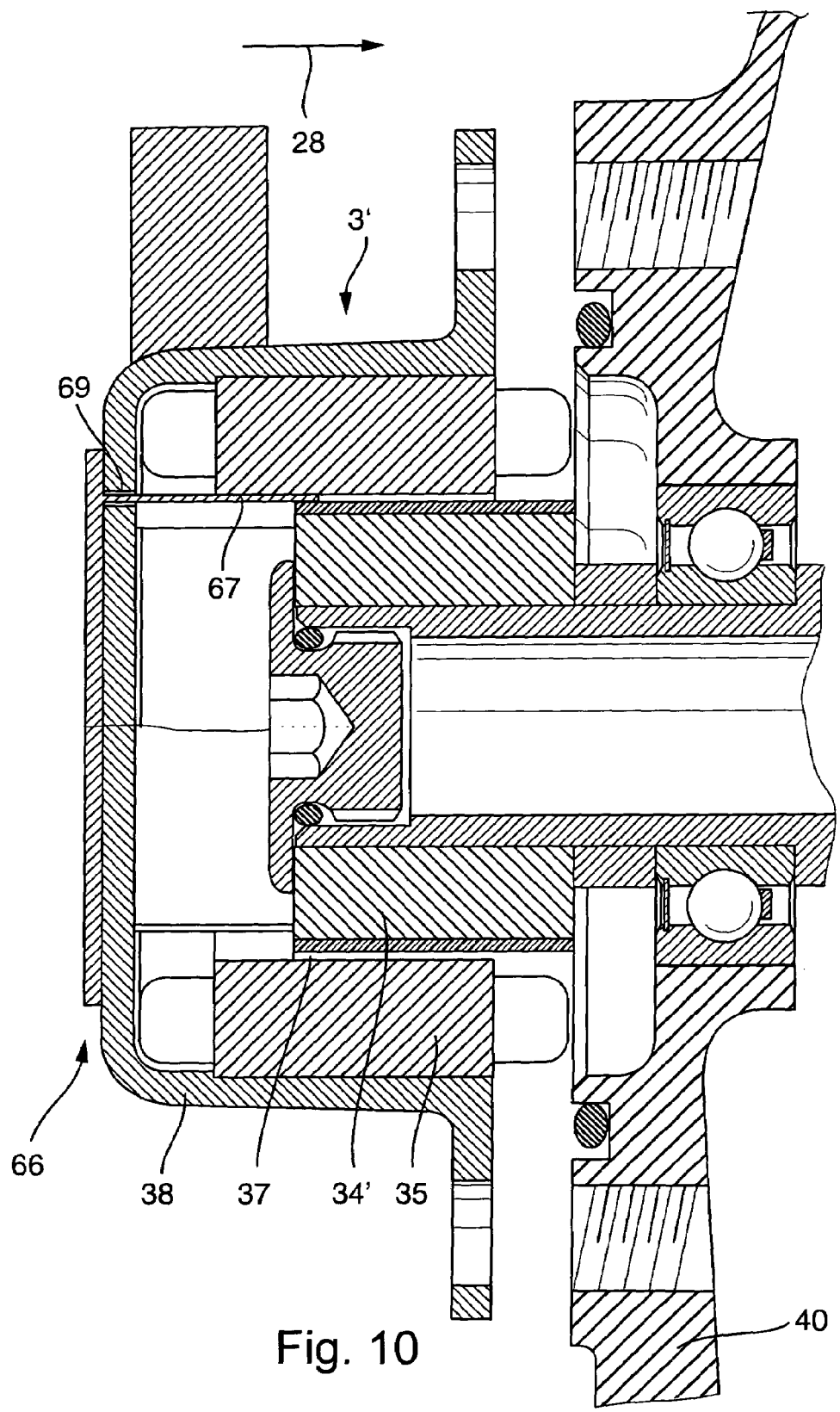
FIG. 10 is a longitudinal section through the adjusting motor from FIG. 7 in the assembled state with an arrow in the assembly direction of the stator.
Figure 11:
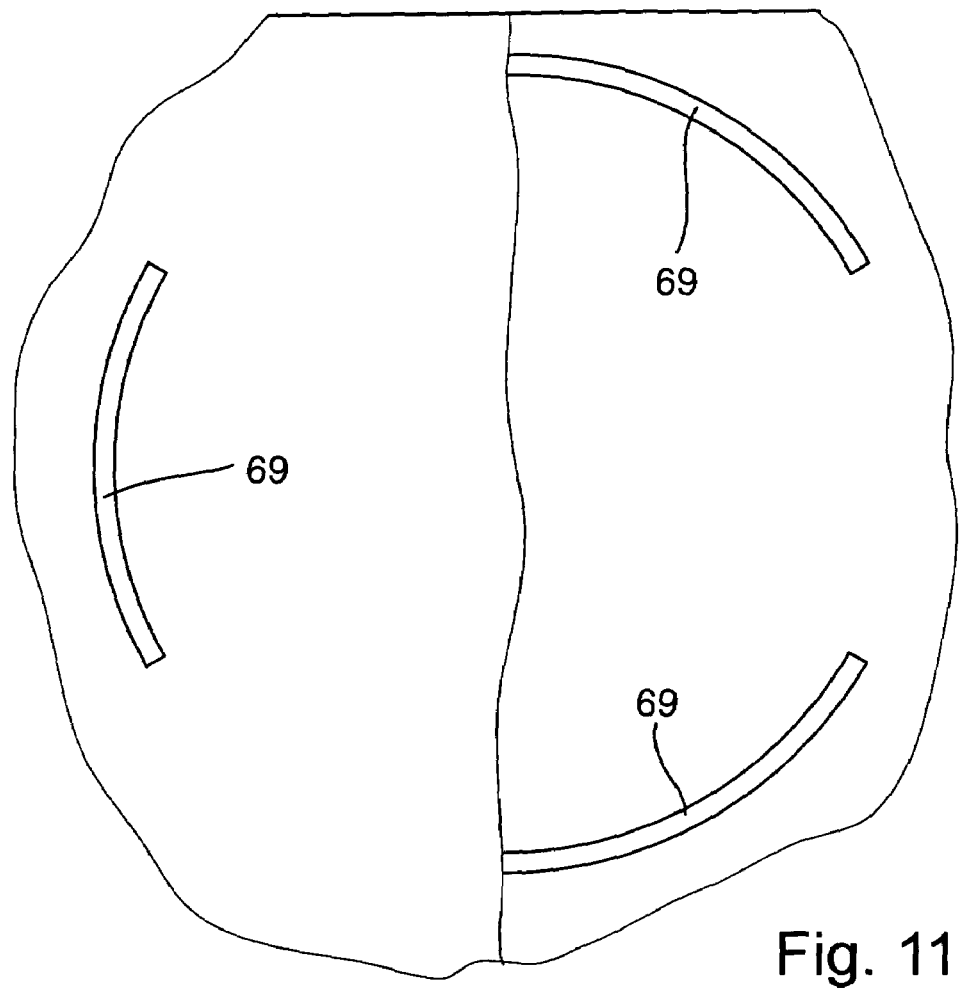
FIG. 11 is a partial section of the electric motor housing from FIG. 10 with assembly slots for the assembly tool.
Figure 12:
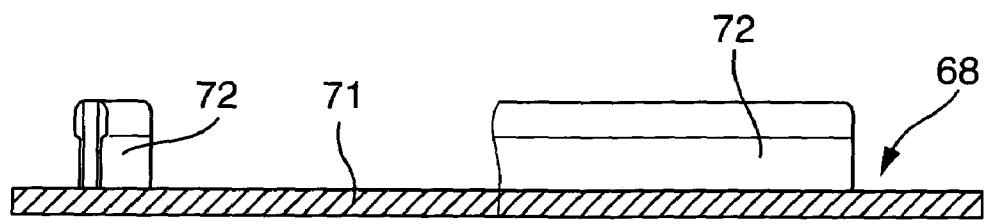
FIG. 12 is a longitudinal section through a closing cover for the assembly slots from FIG. 11.
Figure 13:
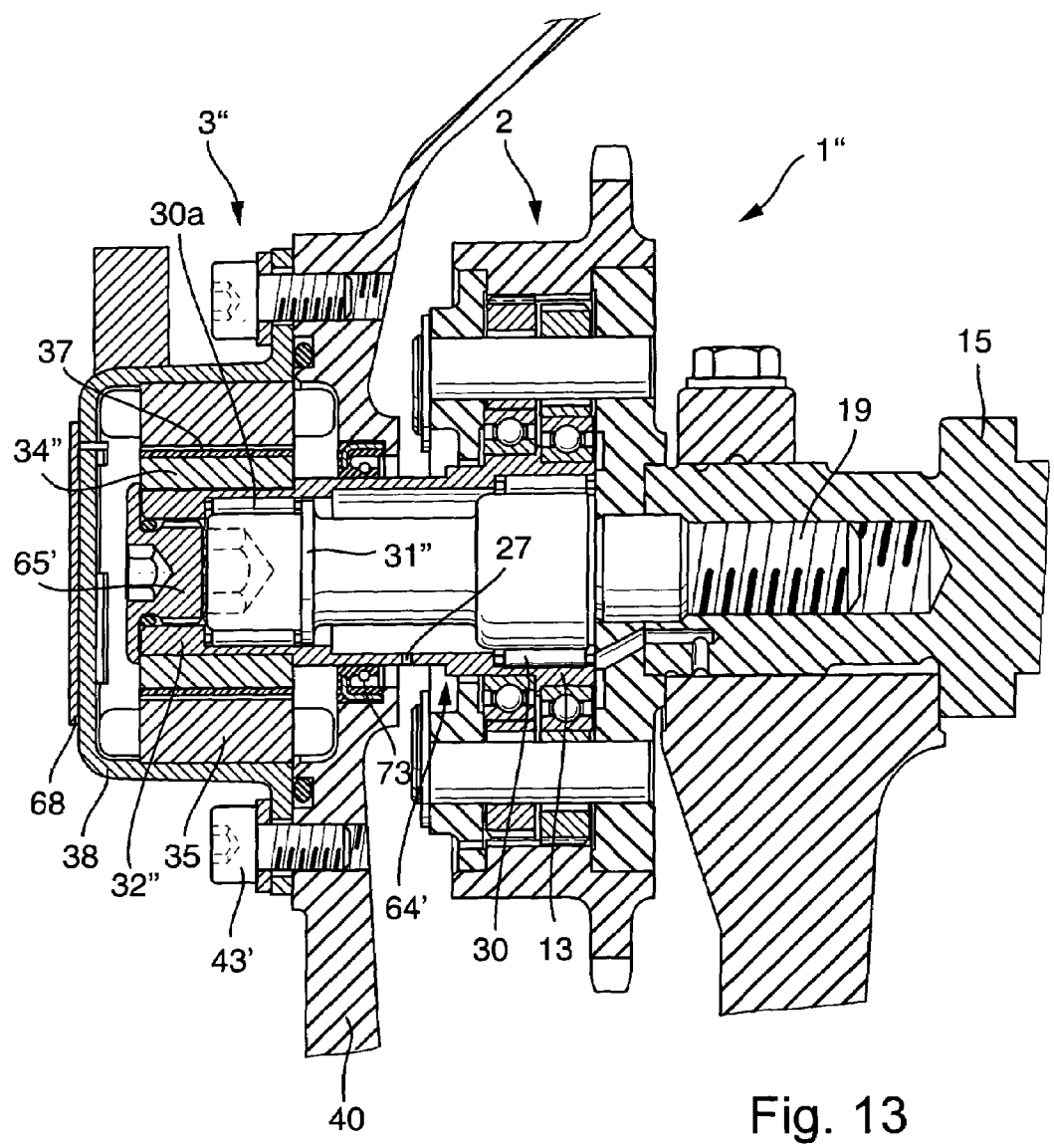
FIG. 13 is a longitudinal section through a variant of the adjusting device from FIG. 7, in which the one-piece hollow shaft is supported with the eccentric shaft bearing and with an internal rotor bearing on an extended tension screw.

FIG. 10 shows the assembly tool 66 during the assembly of the adjusting motor 3'. The assembly direction is indicated by the arrow 28. The vanes 67 have been guided through assembly slots 69 of the outer adjusting motor housing 38 and along the stator 35. The vanes 67 extend into the air gap 37, so that the outer adjusting motor housing 38 is aligned with the stator 35 on the permanent magnet rotor 34' and slides in its end position in the cylinder head 40 in order to be screwed in there. In principle, the positioning and aligning of the stator 35 can also be realized in a different way than by means of the air gap 37. The assembly slots 69 in the outer adjusting motor housing 38 (see also FIG. 11) are closed after their assembly and after removing the assembly tool 66 with a closing cover 68 (see FIG. 12) in order to prevent penetration of dirt and water into the outer adjusting motor housing 38. Similar to the assembly tool 66, the closing cover 68 has a cover plate 71 with double-walled cover vanes 72. These engage in the assembly slot 69 in a spring-like way and thus fix the closing cover 68. This state is shown in FIGS. 7 and 13. The outer adjusting motor housing 38 is sealed relative to the cylinder head 40 by an O-ring, whose groove can be located in the outer adjusting motor housing 38 or in the cylinder head 40. The threading of the attachment screws 43' are sealed as in FIG. 1 with sealing mass or by a pocket hole threaded bore hole.

The solution variant from FIG. 7 can also be formed with an outer and inner adjusting motor housing 38, 39 from FIG. 1. Then the grooved ball bearing 45 is not located in the cylinder head 40 but instead in the inner adjusting motor housing 39. Here, it must be guaranteed that the outer diameter of the grooved ball bearing 45 is greater than the outer diameter of the permanent magnet rotor 34', so that the inner adjusting motor housing 39 can be pushed over the permanent magnet rotor 34' during assembly.

FIG. 13 shows a longitudinal section through an adjusting device 1", with the double eccentric gear mechanism 2 and an adjusting motor 3", which represents a variant of the adjusting device 1' of FIG. 7. Here, the double eccentric shaft 13 and an adjusting motor shaft 32" together also form a one-piece hollow shaft 64'. However, in addition to the double eccentric shaft bearing 30, this also has an inner rotor bearing 30a, which is likewise formed as a needle bushing and which is supported on another cylindrical screw head 31" of an extended central tension screw 19. The adjusting motor 3" is sealed relative to the double eccentric gear mechanism 2 by a radial shaft seal ring 73 and a closing stopper 65' sealing the hollow shaft 64'. For reducing the friction moment, instead of the radial shaft sealing ring 73, contact force-reducing sealing means, such as PTFE sealing rings, can also be used. Oil is removed from the hollow shaft 64' through a radial outlet opening 27 into the space of the cylinder head 40.

Due to the expansion of the camshaft 15 due to heat (see FIGS. 7 and 13) together with the resulting tightly connected hollow shafts 64, 64', the axial position of the permanent magnet rotor 34', 34" changes relative to the stator 35. To always keep the usable rotor length equal to the length of the stator armature stampings, the length of the permanent magnet rotor 34', 34" must exceed that of the stator 35 by the extent of axial expansion due to heat. Alternatively, the armature stampings of the stator 35 can be longer than the permanent magnet rotor 34, 34" by at least the axial displacement. Therefore, however, the total length of the adjusting motor 3', 3" is increased by the extent of the maximum expansion due to heat.

Figure 14:
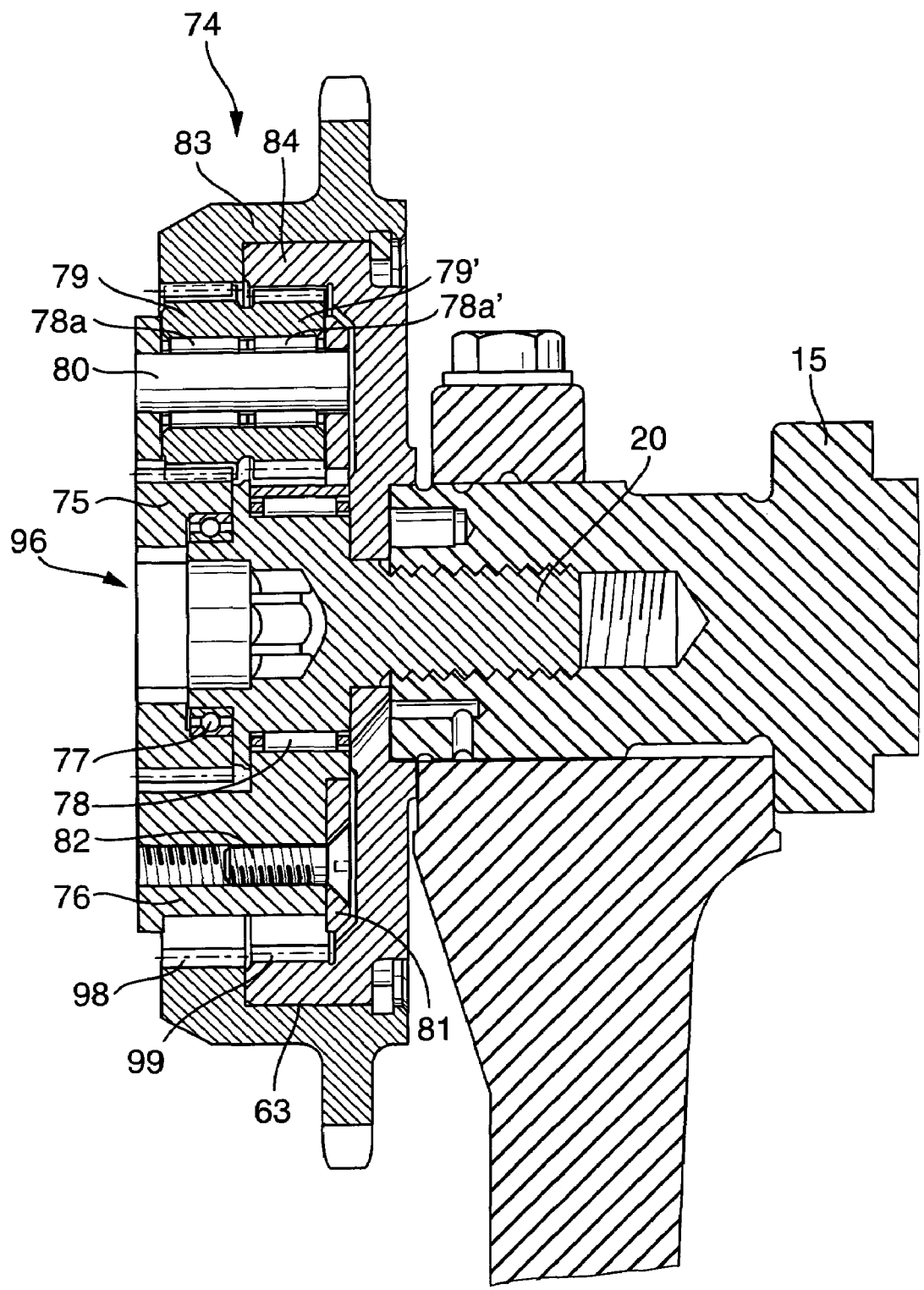
FIG. 14 is a longitudinal section through an adjusting gear mechanism formed as a double planetary gear mechanism, with one-piece planetary gears supported on planetary bearings.

FIG. 14 shows another high speed reducing adjusting gear mechanism in the configuration of a double planetary gear mechanism 74. As an adjusting shaft, a sun wheel 75, which can be driven by a not-shown adjusting motor shaft, is used. The sun wheel 75 is supported in a grooved ball bearing 77 and a planetary carrier 76 is supported in a planetary carrier bearing 78 directly on a central tension screw 20. In this case, it is also possible to replace the grooved ball bearing 77 and the planetary carrier bearing 78 by sliding bearings and the tension screw 20 by a standard screw with matching bearing bushing. The sun wheel 75 meshes with planetary gears 79, 79', which have a different diameter, which are formed in one piece, and which are supported by means of planetary bearings 78a, 78' on connecting pins 80. The connecting pins 80 are connected rigidly to the planetary carrier 76 and in a sliding manner to a closing plate 81. The closing plate 81 is connected in a disengaging manner to the planetary carrier 76 by screws 82. It is used for assembling the planetary gears 79, 79'. The planetary gear 79 meshes with the internal gearing 98 of a crankshaft-fixed ring gear 83 and the planetary gear 79' meshes with the internal gearing 99 of a camshaft-fixed ring gear 84, which is tensioned by the central tension screw 20 with the camshaft 15. Through the slightly different number of teeth of the planetary gears 79, 79' and the ring gears 83, 84, the desired large speed reduction is achieved. The crankshaft-fixed ring gear 83 is supported on the camshaft-fixed ring gear 84 in a sliding bearing 63. However, it can also be supported on roller bearings.

In FIGS. 15, 15a, and 16, separately formed planetary gears 79a, 79a', and 79b, 79b' are shown, which are connected in a torsion-proof manner by a splined shaft 85 or a feather key connection 86. The splined shaft 85 with the planetary gears 79a and 79a', as well as the planetary gears 79b and 79b', are supported by rollers in the planetary carrier 76 and in the closing plate 81.

Figures 17, 18:
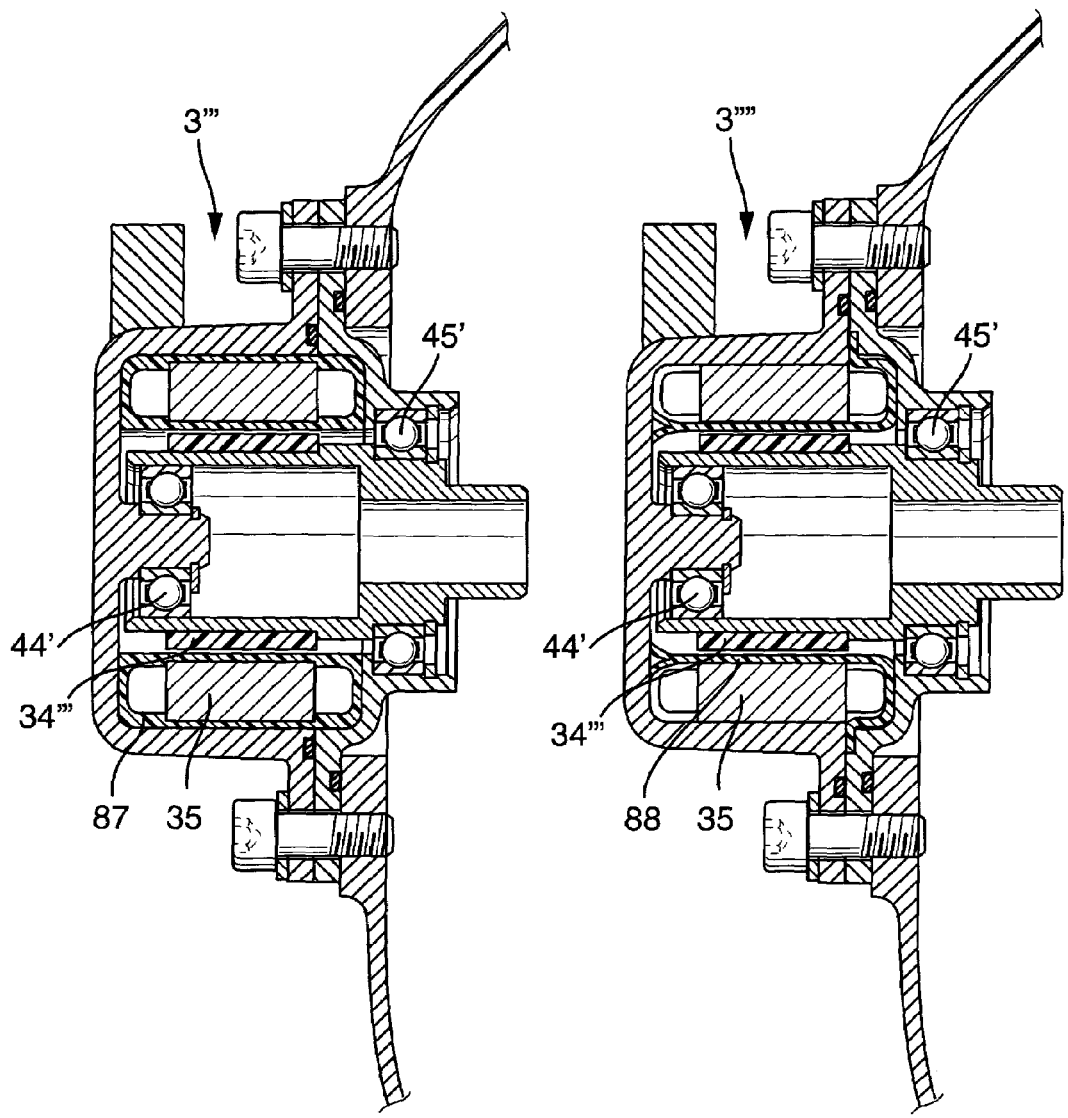
FIG. 17 is a longitudinal section through an adjusting motor similar to that from FIG. 1, but whose stator has an injection-molded part made from plastic.
FIG. 18 is a longitudinal section through the adjusting motor similar to that from FIG. 1, but with a stator covered by a cover film.

In FIGS. 17 and 18, brushless adjusting motors 3''', 3'''' with a stator 35 and a permanent magnet rotor 34''' are shown in longitudinal section, which are similar to the adjusting motor 3 from FIG. 1. However, they have unsealed, oil-lubricated, and especially low-friction grooved ball bearings 44', 45'. Due to the lack of sealing, motor oil penetrates into the interior of the adjusting motors 3''', 3''''. Therefore, there is the risk that the insulating coating on the winding wire of the stator 35 will be attacked and a winding short circuit will be triggered. In addition, the PC board or the Hall sensors necessary for the electronic commutation could be destroyed. Therefore, all components vulnerable to motor oil are protected against motor oil in FIG. 17 by an injection-molded part 87 made from heat-resistant and oil-resistant plastic and in FIG. 18 by covers with a covering film 88 made from comparable plastic, wherein the covering film 88 can also be configured differently than shown.

To prevent metal filings from the motor oil from settling on the permanent magnet rotor 34''', which itself does not have to be protected from penetrating oil, a filter or screen can be arranged in front of the grooved ball bearings 44' and 45'. Because this configuration concerns non-contacting seals, a sealing-specific friction moment is also not produced.

Figure 19:
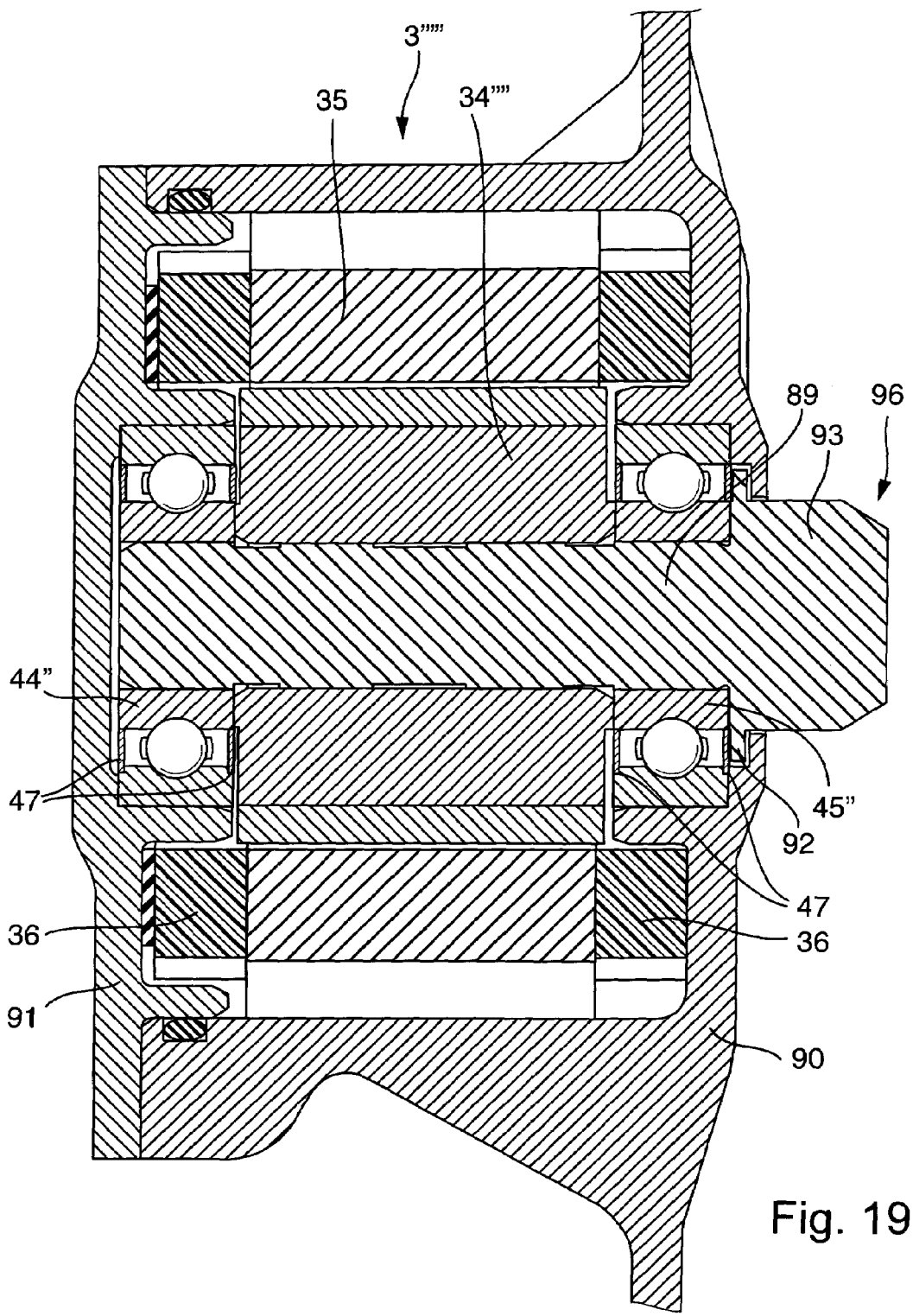
FIG. 19 is a longitudinal section through an adjusting motor as in FIG. 1, but with a solid adjusting motor shaft, which is supported in two grooved ball bearings, which are arranged next to a permanent magnet rotor, which are lubricated with grease, and which are sealed on two side.

In FIG. 19, an enlarged longitudinal section of a brushless adjusting motor 3'''''is shown, which is formed as a separate unit. This has a solid adjusting motor shaft 89, which is connected rigidly to a permanent magnet rotor 34'''' and which is supported on grooved ball bearings 44", 45". The relatively small diameter of the solid adjusting motor shaft 89 enables the housing of the grooved ball bearings 44", 45" within the winding heads 36 of the stator 35. Therefore, a small structural length is achieved. The grooved ball bearing 45" is arranged in an adjusting motor housing 90 and the grooved ball bearing 44" is arranged in its housing cover 91. Both grooved ball bearings 44", 45" are lubricated with grease and sealed on two sides with seals 47.

A centrifugal disk 92, which is covered by the adjusting motor housing 90 and which acts as an additional labyrinth seal, is arranged in front of the grooved ball bearing 45" on the gear mechanism-side of the adjusting motor shaft 89. Naturally, other labyrinth seals are also possible. On the gear mechanism-side end of the adjusting motor shaft 89, there is a coupling head 93 with a splined shaft profile 96, which can be inserted into the corresponding part of the adjusting shaft of an adjusting gear mechanism.

Figure 20:
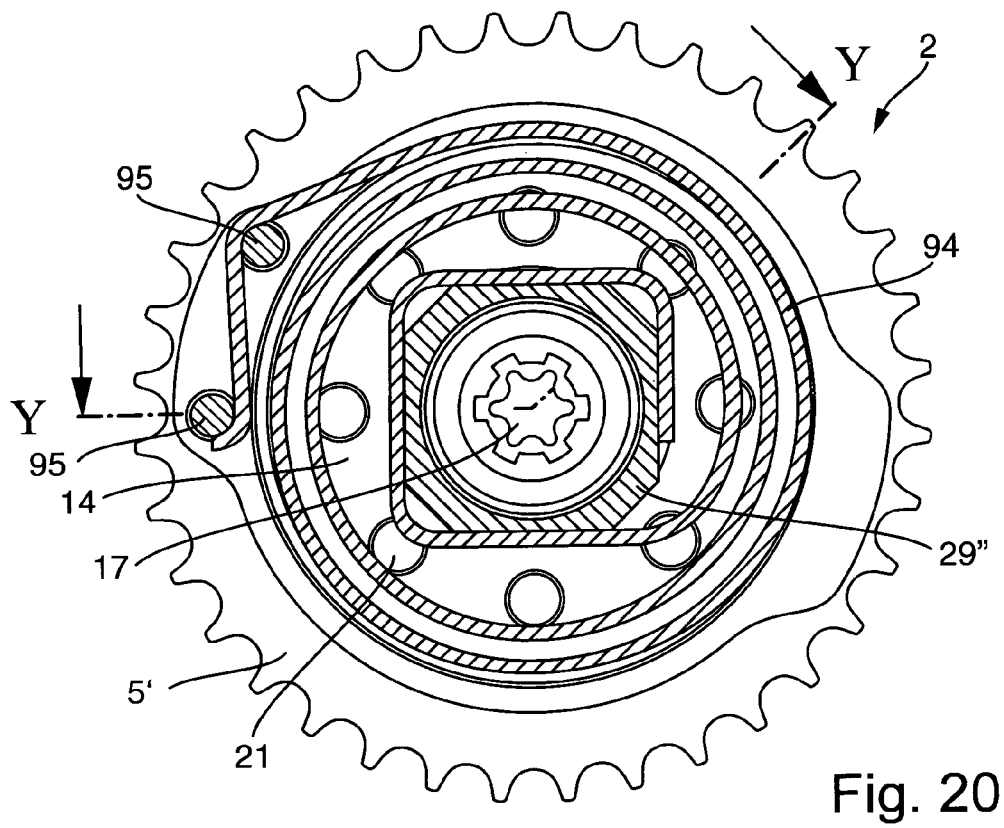
FIG. 20 is a cross section X—X through a spiral spring from FIG. 21, which connects a chain wheel formed as a drive shaft to a closing cover of a double eccentric gear mechanism formed as a driven shaft.

FIG. 20 shows a view of a double eccentric gear mechanism 2 similar to that in FIG. 1, comprising a spiral spring 94 shown in a cross section X—X. This connects a chain wheel 5' (equal to the drive shaft) modified by retaining pin 95 via a modified closing cover 29" (equal to the driven shaft), the cylinder pins 21, and the closing wall 14 under the interaction of a central tension screw 17 with the camshaft 15.

Figure 21:
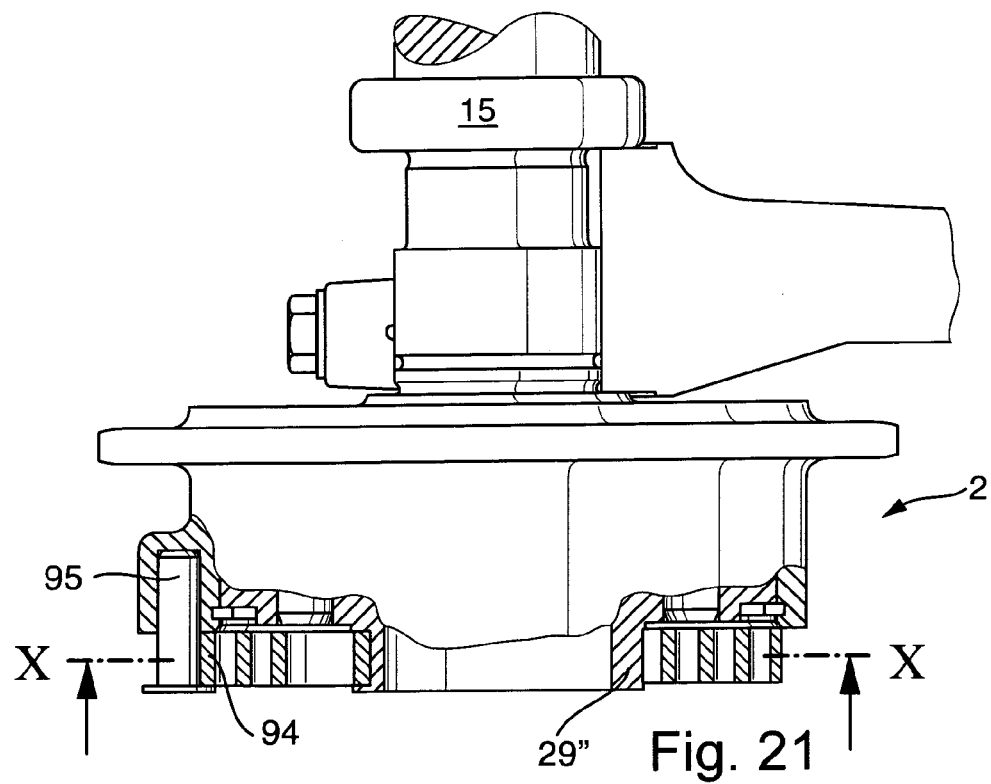
FIG. 21 is a partial longitudinal section Y—Y through the double eccentric gear mechanism from FIG. 20 with its spiral spring.

FIG. 21 shows a partial longitudinal section through the double eccentric gear mechanism 2 and the spiral spring 94 with one of the retaining pins 95 for the spiral spring 94 and with a part of the closing cover 29", on which the spiral spring 94 is likewise anchored. The biased spiral spring 94 guides the camshaft 15 back into a starting or emergency running position if there is a failure of the electric angle of rotation adjustment, in order to guarantee reliable restarting of the internal-combustion engine. It thus fulfills a fail safe function.

In the adjusting device according to the invention, the adjusting motor is operated so that when it is adjusted in the early direction, the camshaft overtakes the crankshaft and when it is adjusted in the late direction, the crankshaft overtakes the camshaft, while in the set position, all three shafts of the adjusting gear mechanism rotate at the speed of the camshaft. The direction of rotation of the adjusting motor during the adjustment depends on whether the adjusting gear mechanism is a positive or negative gear mechanism.

All of the previously described variants can be combined with each other in terms of gear mechanism, adjusting motor, bearing, sealing, and lubrication.

List of reference symbols

| | |
|---|---|
| 1, 1', 1" | Adjusting device |
| 2, 2', 2" | Double eccentric gear mechanism |
| 3, 3', 3", 3'", 3"", 3""' | Adjusting motor |
| 4 | Ring gear |
| 5, 5' | Chain wheel |
| 6 | Internal gearing |
| 7 | Spur pinion |
| 8 | Spur pinion |
| 9 | Spur pinion bearing |
| 10 | Spur pinion bearing |
| 11 | Eccentric |
| 12 | Eccentric |
| 13, 13', 13" | Double eccentric shaft |
| 14 | Closing wall |
| 15, 15' | Camshaft |
| 16 | Guide |
| 17 | Central tension screw |
| 18 | Central standard tension screw |
| 19 | Extended central tension screw |
| 20 | Central tension screw |
| 21, 21', 21" | Driving pin |
| 22 | Spur pinion bore hole |
| 23 | Spur pinion bore hole |
| 24 | Retaining ring |
| 25 | Retaining ring |
| 26 | Outlet opening |
| 27 | Outlet opening |
| 28 | Arrow |
| 29, 29', 29" | Closing cover |
| 30 | Double eccentric shaft bearing |
| 30a | Inner rotor bearing |
| 31, 31", 31'" | Cylindrical screw head |
| 31' | Standard screw head |
| 32, 32', 32" | Adjusting motor shaft |
| 33 | Two-edge shaft coupling |
| 34, 34', 34", 34'", 34"" | Permanent magnet rotor |
| 35 | Stator |
| 36 | Winding head |
| 37 | Air gap |
| 38 | Outer adjusting motor housing |
| 39 | Inner adjusting motor housing |
| 40 | Cylinder head |
| 41 | O-ring |
| 42 | O-ring |
| 43, 43' | Attachment screw |
| 44, 44', 44" | Grooved ball bearing |
| 45, 45', 45" | Grooved ball bearing |
| 46 | Journal |
| 47 | Seal |
| 48 | Lubricating oil bore hole |
| 49 | Lubricating oil bore hole |
| 50 | End bearing |
| 51 | Chain wheel bearing |
| 52 | Outlet opening |
| 53 | Bearing bushing |
| 54 | Feather key shaft coupling |
| 55 | Radial bore hole |
| 56 | Circular spline connection |
| 57 | Inner part |
| 58 | Circular spline |
| 59 | Outer part |
| 60 | Camshaft end |
| 61 | Circular spline bore hub |
| 62 | Profile |
| 63 | Sliding bearing |
| 64, 64' | Hollow shaft |
| 65, 65' | Closing stopper |
| 66 | Assembly tool |
| 67 | Vane |
| 68 | Closing cover |
| 69 | Assembly slot |
| 70 | Base plate |
| 71 | Cover plate |
| 72 | Cover vane |
| 73 | Radial shaft sealing ring |
| 74 | Double planetary gear mechanism |
| 75 | Sun wheel |
| 76 | Planetary carrier |
| 77 | Sun wheel bearing |
| 78 | Planetary carrier bearing |
| 78a, 78a' | Planetary bearing |
| 79, 79' | Planetary gear |
| 79a, 79a' | Planetary gear |
| 79b, 79b' | Planetary gear |
| 80 | Connecting pin |
| 81 | Closing plate |
| 82 | Screw |
| 83 | Crankshaft-fixed ring gear |
| 84 | Camshaft-fixed ring gear |
| 85 | Splined shaft |
| 86 | Feather key connection |
| 87 | Injection-molded part |
| 88 | Cover film |
| 89 | Solid adjusting motor shaft |
| 90 | Adjusting motor housing |
| 91 | Housing cover |
| 92 | Centrifugal disk |
| 93 | Coupling head |
| 94 | Spiral spring |
| 95 | Holding pin |
| 96 | Splined shaft coupling |
| 97 | Pin bore hole |
| 98 | Internal gearing |
| 99 | Internal gearing |

What is claimed is:

1. Adjusting device for electrically adjusting the relative position of the angle of rotation of a camshaft (15, 15') in relation to a crankshaft of an internal-combustion engine, comprising an adjusting gear mechanism, which is formed as a triple-shaft gear mechanism and which has a crankshaft-fixed driving part, a camshaft-fixed driven part, and an adjusting shaft (13, 13', 13") connected in a torsion-proof manner to an adjusting motor shaft (32, 32', 32") of an electric adjusting motor (3 to 3""'), wherein the adjusting motor (3 to 3""') is formed as a brushless DC motor with a housing-fixed stator (35) and a permanent magnet rotor (34 to 34""), the adjusting gear mechanism includes one of a double eccentric gear mechanism (2, 2', 2") and a double planetary gear mechanism (74), which exhibit a speed reduction of up to about 1:250 and low friction, and the adjusting motors (3 to 3"") includes highly inductive permanent magnet rotors (34 to 34"").

2. Adjusting device according to claim 1, wherein bearing for the adjusting gear mechanism and the adjusting motors are preferably formed as roller bearings.

3. Adjusting device according to claim 2, wherein for a torsion-proof connection of the adjusting gear mechanism to the camshaft (15, 15'), central tension screws (17, 18, 19, 20) and a circular spline connection (56) are provided, which have cylindrical screw heads (31, 31") or a cylindrical circular spline bore hub (61), which are used as bearing surfaces for the roller bearings.

4. Adjusting device according to claim 3, wherein a rotational backlash-free, disengaging coupling (33, 54, 96) is provided for connecting the adjusting shaft and the adjusting motor shaft, or the adjusting shaft and the adjusting motor shaft are provided in a one-piece configuration of the two shafts to form a single hollow shaft (64, 64').

5. Adjusting device according to claim 4, wherein for assembling of the adjusting motor (3', 3") and for centering a stator (35) thereof on a permanent magnet rotor (34', 34") thereof, an assembly tool (66) is provided having three equal vanes (67) arranged at equal spacing that is insertable through three corresponding assembly slots (69) into an outer adjusting motor housing (38) and into an air gap (37) between the permanent magnet rotor (34', 34") and the stator (35) with minimal radial play and a matching closing cover (68) is used to cover the slots (69).

6. Adjusting device according to claim 4, wherein a two-edge, feather key, or splined shaft couplings (33, 54, 96) are provided as the rotational backlash-free, disengaging couplings.

7. Adjusting device according to claim 4, wherein the hollow shaft (64) has, in addition to an adjusting shaft bearing (30, 77), an outer grooved ball bearing (45) in front of the permanent magnet rotor (34') and the hollow shaft (64') has another inner rotor bearing (30a) on another cylindrical screw head (31") of an extended, central tension screw (19) in a region of the permanent magnet rotor (34").

8. Adjusting device according to claim 7, wherein the hollow shafts (64, 64') have at least one outlet bore hole (26, 27) for lubricating oil and an adjusting motor-side closing stopper (65, 65').

9. Adjusting device according to claim 8, wherein the adjusting gear mechanism has oil-lubricated roller bearings and the adjusting motors have oil-lubricated and grease-lubricated roller bearings.

10. Adjusting device according to claim 9, wherein the lubricating oil for the adjusting gear mechanism is led from the oil supply of the end bearing (50) of the camshaft (15, 15') near the gear mechanism through lubricating-oil bore holes (48, 49) into a region of the adjusting gear mechanism near the axle and from there due to centrifugal force to the bearings and into the peripheral region, as well as farther into a space of the cylinder head (40), where it is used for centrifugal oiling or as spray oil for lubricating the oil-lubricated roller bearings (45, 30a, 44', 45') of the adjusting motors (3, 3''', 3"").

11. Adjusting device according to claim 10, wherein a seal (47) is provided on both bearing sides of grease-lubricated roller bearings (44, 44", 45") of the adjusting motors (3, 3""'') and on the adjusting motor-side of the oil-lubricated roller bearings (45) of the adjusting motors (3, 3').

12. Adjusting device according to claim 11, wherein the roller bearings (44', 45') of the adjusting motors (3''', 3"") are formed without seals (47), but have at least one screen or filter for protection against metal particles on the adjusting gear mechanism side.

13. Adjusting device according to claim 12, wherein a cover film (88) made from oil-resistant and heat-resistant plastic and also an injection-molded part with the same plastic are provided as protection means from lubricating oil for the stator (35) together with the PC board and Hall sensors.

14. Adjusting device according to claim 11, wherein the grease-lubricated roller bearings (44", 45") of the adjusting motor (3"''') are arranged on a solid adjusting motor shaft (89) directly next to the permanent magnet rotor (34"") and at least partially within winding heads (36) of the stator (35).

15. Adjusting device according to claim 14, wherein a centrifugal disk (92) is provided on an outer side of the gear mechanism-side, grease-lubricated roller bearing (45") of the adjusting motor (3"''').

16. Adjusting device according to claim 15, wherein, in comparison with the stator (35), the permanent magnet rotors (34', 34") have a length increased by a maximum difference in length due to expansion.

17. Adjusting device according to claim 16, wherein the stator (35) can be cooled by a coolant comprising air and/or a cooling fluid.

18. Adjusting device according to claim 1, wherein the adjusting shaft of the double eccentric gear mechanism (2, 2', 2") is formed as a double eccentric shaft (13, 13', 13") with two equal eccentrics (11, 12), which are offset by 180° and which drive equal spur pinions (7, 8) that mesh with equal internal gearing (6) of a crankshaft-fixed ring gear (4), whose drive moment can be transferred to a camshaft-fixed closing wall (14) by driving pins (21, 21', 21").

19. Adjusting device according to claim 18, wherein the driving pins (21, 21', 21") are pressed into axis parallel pin bore holes (97) of the closing wall (14) and engage with a positive fit in axis parallel spur pinion bore holes (22, 23) of the spur pinions (7, 8).

20. Adjusting device according to claim 19, wherein a diameter of the spur pinion bore holes (22, 23) corresponds to at least a diameter of the driving pins (21, 21', 21") increased by twice an eccentricity of the eccentrics (11, 12) and the spur pinion bore holes (22, 23) and the pin bore holes (97) have equal pitch diameters and equal spacing.

21. Adjusting device according to claim 1, wherein the adjusting shaft of the double planetary gear mechanism (74) is formed as a sun wheel (75), which is supported on a central tension screw (20) in a sun wheel bearing (77) and which is connected in a torsion-proof manner to the adjusting motor via a splined shaft coupling (96).

22. Adjusting device according to claim 21, wherein the sun wheel (75) meshes with first planetary gears (79, 79a, 79b), which are connected in a torsion-proof manner to coaxial, second planetary gears (79', 79a', 79b') of different diameter.

23. Adjusting device according to claim 22, wherein the first planetary gears (79, 79a, 79b) mesh with internal gearing (98) of a crankshaft-fixed ring gear (83) and the second planetary gears (79', 79a', 79b') mesh with internal gearing (99) of different diameter of a camshaft-fixed ring gear (84).

24. Adjusting device according to claim 23, wherein the planetary gears (79, 79') are formed in one piece and supported by planetary bearings (78a, 78a') on axis parallel connecting pins (80), which connect rigidly to a planetary carrier (76) that is supported by rollers via a planetary carrier bearing (78) on another cylindrical screw head (31''').

25. Adjusting device according to claim 24, wherein separate planetary gears (79*a*, 79*a'*) are connected in a torsion-proof manner by a splined shaft (85) and other separate planetary gears (79*b*, 79*b'*) are connected in a torsion-proof manner by a feather key connection (86) and are supported by rollers directly in the planetary carrier (76) and a closing plate (81) thereof.

26. Adjusting device according to claim 25, wherein the drive and driven shafts of the adjusting gear mechanism can be connected by a biasing spring (94), which moves the camshaft (15, 15') into a starting or emergency running position against a friction moment of the camshaft (15, 15') if a power supply or the adjusting motors fails.

* * * * *